US008310979B2

(12) United States Patent
Mason et al.

(10) Patent No.: US 8,310,979 B2
(45) Date of Patent: Nov. 13, 2012

(54) MESSAGE REPEATER AND METHOD OF OPERATION

(75) Inventors: Gary W. Mason, Melbourne, FL (US); Mark E. Smith, Temecula, CA (US)

(73) Assignee: General Electric Company, Schenectady, NY (US)

( * ) Notice: Subject to any disclaimer, the term of this patent is extended or adjusted under 35 U.S.C. 154(b) by 592 days.

(21) Appl. No.: 12/234,664

(22) Filed: Sep. 21, 2008

(65) Prior Publication Data

US 2010/0074160 A1 Mar. 25, 2010

(51) Int. Cl.
*H04B 7/14* (2006.01)
(52) U.S. Cl. ........................................ 370/315; 370/229
(58) Field of Classification Search .......... 370/229–236, 370/315; 455/422.1, 69, 67.11; 701/1, 19, 701/20
See application file for complete search history.

(56) References Cited

U.S. PATENT DOCUMENTS

| 3,646,441 | A | | 2/1972 | Magnuski |
| 3,675,128 | A | | 7/1972 | Abele |
| 4,582,280 | A | * | 4/1986 | Nichols et al. ............ 246/182 R |
| 6,041,216 | A | | 3/2000 | Rose et al. |
| 6,401,015 | B1 | * | 6/2002 | Stewart et al. ................... 701/19 |
| 6,759,951 | B2 | | 7/2004 | Kellner et al. |
| 6,997,418 | B1 | | 2/2006 | Sanzone |
| 7,606,530 | B1 | | 10/2009 | Anderson et al. |
| 7,634,264 | B2 | * | 12/2009 | Yahagi ........................ 455/422.1 |
| 8,190,315 | B2 | * | 5/2012 | Kraeling et al. ................ 701/20 |
| 2002/0027495 | A1 | * | 3/2002 | Darby et al. ................... 340/298 |
| 2003/0094546 | A1 | * | 5/2003 | Kellner et al. ............ 246/167 R |
| 2003/0124976 | A1 | * | 7/2003 | Tamaki et al. ................... 455/15 |
| 2003/0142623 | A1 | * | 7/2003 | Bernhard et al. ............. 370/229 |
| 2003/0227580 | A1 | * | 12/2003 | Ono et al. ........................ 349/43 |
| 2004/0117073 | A1 | | 6/2004 | Horst |
| 2004/0120305 | A1 | | 6/2004 | Aiken et al. |

* cited by examiner

*Primary Examiner* — Gary Mui
(74) *Attorney, Agent, or Firm* — GE Global Patent Operation; John A. Kramer

(57) ABSTRACT

A method is provided for operating a distributed power repeater for a train system. The method includes: (a) monitoring all radio traffic on a wireless communications channel used by the repeater to relay distributed power commands between a plurality of transmitters and receivers disposed on a plurality of trains for distributed power control of the trains; (b) determining the level of channel loading on the communications channel; (c) comparing the channel loading to a predetermined limit; (d) if the channel loading is less than the predetermined limit, relaying messages over the wireless communications channel at a first activity level; and (e) if the channel loading exceeds the predetermined limit, relaying messages over the wireless communications channel at a second activity level less than the first activity level.

25 Claims, 2 Drawing Sheets

MESSAGE REPEATER AND METHOD OF OPERATION

BACKGROUND OF THE INVENTION

This invention relates generally to trains and other rail vehicles and more particularly to systems and methods for wireless communication with trains.

It is known to control braking, throttle, and other train functions remotely using distributed power control systems for locomotives (hereinafter Distributed Power or DP systems or simply DP), in which the operation of one or more remote locomotives (or group of locomotives forming a locomotive remote) is remotely controlled from the lead locomotive of the train, or an external site such as a control tower, by way of a radio or hard-wired communication system. One such radio-based DP system is commercially available under the trade name LOCOTROL, and is described in U.S. Pat. No. 4,582,280 (hereinafter "the '280 patent").

Such systems often use radio repeaters to assist distributed power lead units in linking and commanding their remotes. For example, repeaters may be used in hilly territory, tunnels, or other areas where there is not a clear line-of-sight between the lead unit and remote.

These repeaters add additional radio traffic to the communication channel. In areas with heavy radio traffic, such as rail yards, the repeater activity can cause saturation in an already-heavily congested channel, and prohibit trains from linking or commanding remotes. The radio traffic congestion can be eliminated by disabling the repeater operation entirely; however this is an inefficient solution because it defeats the very purpose of having the repeaters in place.

BRIEF SUMMARY OF THE INVENTION

These and other shortcomings of the prior art are addressed by the present invention, which provides a method for analyzing message traffic and adjusting repeater behavior to reduce congestion.

According to one aspect of the invention, a method is provided for operating a distributed power repeater for a train system. The method includes: (a) monitoring all radio traffic on a wireless communications channel used by the repeater to relay distributed power commands between a plurality of transmitters and receivers disposed on a plurality of trains for distributed power control of the trains; (b) determining the level of channel loading on the communications channel; (c) comparing the channel loading to a predetermined limit; (d) if the channel loading is less than the predetermined limit, relaying messages over the wireless communications channel at a first activity level; and (e) if the channel loading exceeds the predetermined limit, relaying messages over the wireless communications channel at a second activity level less than the first activity level.

According to another aspect of the invention, a distributed power repeater is provided for a train system. The repeater is programmed to: (a) monitor all radio traffic on a wireless communications channel used by the repeater to relay distributed power commands between a plurality of transmitters and receivers disposed on a plurality of trains for distributed power control of the trains; (b) determine the level of channel loading on the communications channel; (c) compare the channel loading to a predetermined limit; (d) if the channel loading is less than the predetermined limit, relay messages over the wireless communications channel at a first activity level; and (e) if the channel loading exceeds the predetermined limit, relay messages over the wireless communications channel at a second activity level less than the first activity level.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
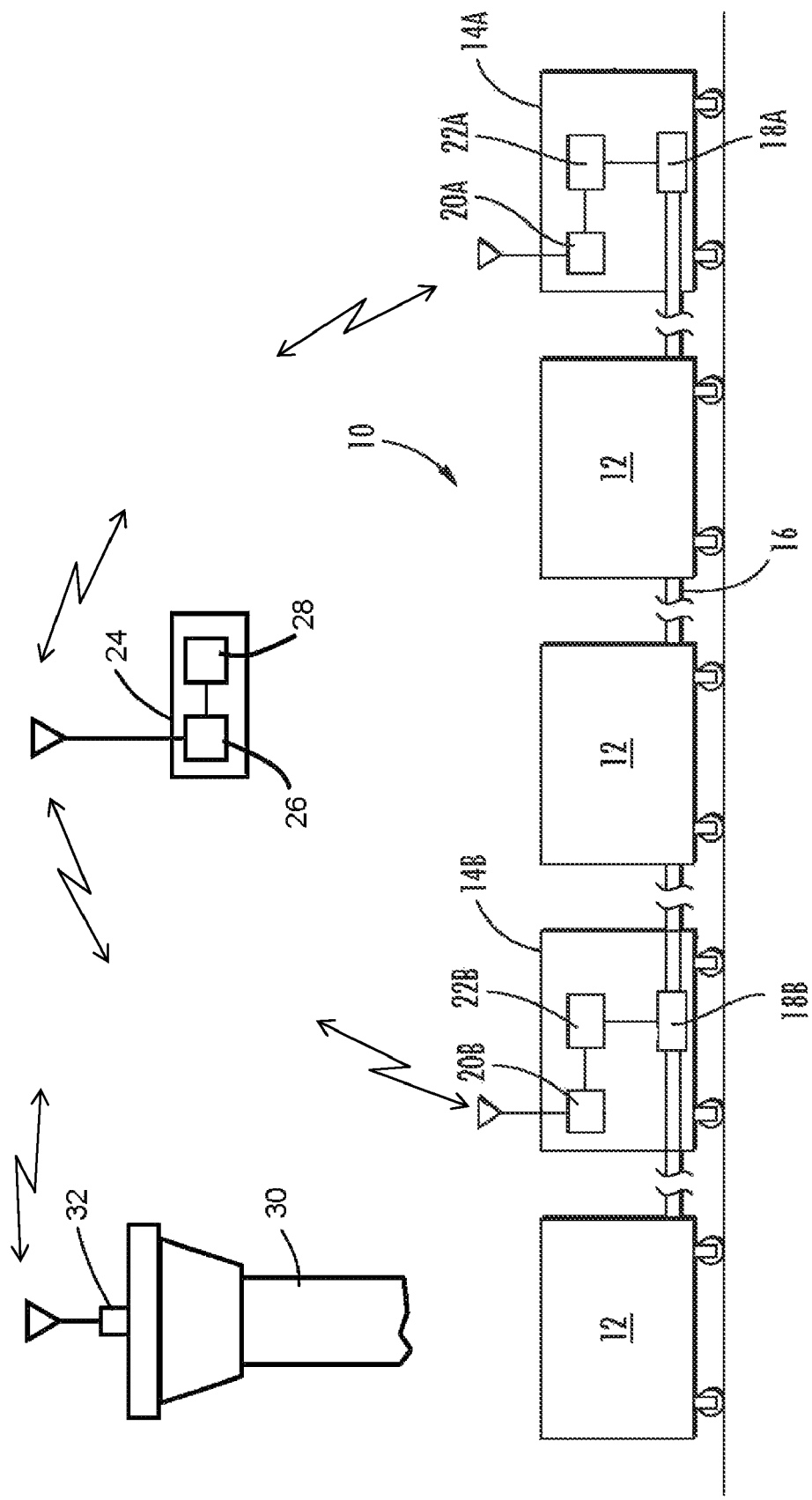
FIG. 1 is a schematic view of a train incorporating a distributed power and message repeater system constructed according to an aspect of the present invention.

Referring to the drawings wherein identical reference numerals denote the same elements throughout the various views, FIG. 1 depicts a train 10 having a distributed power system, which in turn incorporates a message repeater system constructed according to an aspect of the present invention. The train 10 includes a plurality of coupled cars 12, and two or more locomotives or other units which provide tractive force, referred to herein generally as "power units". The individual cars 12 are coupled together by a brake pipe 16 that conveys air pressure changes specified by individual air brake controllers in the power units. As used herein, the term "air brake controller" refers generally to one or more components which cooperate to selectively hold or release pressure from the brake pipe 16 and which may include mechanical valves, electrical or electronic controls associated with those valves, or combinations thereof. Each of the cars 12 is provided with a known type of air brake system which functions to apply air brakes on the car 12 upon a pressure drop in the brake pipe 16 and to release the air brakes upon a pressure rise.

One of the power units, typically at the front of the train 10, is designated as a "lead unit" or "lead" 14A, while the remaining power units are designated as "remote units" or "remotes" 14B. The lead unit 14A includes a lead radio transceiver 20A which functions to receive and transmit radio frequency (RF) communications over a wireless intra-consist communications channel. (A "consist" is a group of one or more locomotives or other power units in a train.) The specific frequency band and data format of the communications channel is not critical. In one example, four discrete FM half-duplex channels in the UHF frequency band are available concurrently, and communications are sent over the selected using a serial binary code that is frequency-shift-keying ("FSK") encoded.

The lead unit 14A also includes a lead distributed power (DP) processor 22A that is operably connected to the lead transceiver 20A, to the power unit's power controls (e.g., throttle and reverser), and to the lead brake controller 18A. It is noted that, in the figures, the lines shown connecting individual devices or components represent their logical or functional interconnections and need not be physical connections. For example, in some implementations these connections may take the form of messages on a data network.

The remote unit 14B is equipped with a remote transceiver 20B, remote DP processor 22B, and remote brake controller 18B, corresponding to the similar components in the lead unit 14A. It will be understood that the power units may be identically equipped, and that any of the power units may function as a lead unit 14A or a remote unit 14B depending upon setting of controls in the individual units. Furthermore, subsequent references to actions or operations of the lead unit 14A and/or the remote units 14B will be understood to encompass operations that are carried out by the transceivers 20, DP processors 22, and/or brake controllers as well.

One or more off board repeaters 24 are disposed within radio communication distance of the train 10 for relaying communications transmitted between the lead unit 14A and one of the remote units 14B. The off board repeater 24 would typically be used in a situation where direct communications between the lead unit 14A and the remote units 14B are hampered such as while the train 10 is within a tunnel, or where the line of sight is otherwise obscured. Off board repeaters are also sometimes deployed at locations with heavy rail traffic, such as rail yards, to assist with relaying intra-consist communications. The repeater 24 includes a transceiver 26 that operates under the control of one or more processors 28 to intelligently relay (e.g., receive and retransmit) messages from lead units 14A to remote units 14B over the wireless communications channel.

A control tower 30 or other fixed structure may also be provided with a transceiver 32 for two-way communications with the repeaters 24 or the train 10.

As noted above, radio messages are transmitted as a binary code. The messages are formatted and transmitted using a protocol that ensures message security and prevents remote units 14B from responding to spurious transmissions. One nonlimiting example of a suitable protocol is described in the above-noted '280 patent. The details of the communications protocol are beyond the scope of this description, but it will be briefly summarized here.

Initially, a lead unit 14A will transmit a "link" message, which is encoded with unique identifiers of both the lead unit 14A and a remote unit 14B that is intended to be linked, to the remote unit 14B. The identifiers may be, for example, serial numbers of the units. Once the lead unit 14A verifies through reception of a "link reply" that proper link message is received, a uniquely identifiable communications "session" is considered to be initiated between the lead unit 14A and the remote unit 14B.

Thereafter, the lead unit 14A will send encoded commands to the remote unit 14B over the communications channel. Examples of commands include throttle notch settings, reverser commands, service braking applications, emergency brake applications, and the like. The remote DP system 22B in the remote unit 14B receives and decodes these messages and actuates the controls of the remote unit 14B accordingly. It also sends a command reply to the lead unit 14A over the communications channel. The session will continue until it is intentionally terminated, or it may "time out" if either (1) no messages are received by the remote unit 14B in a designated timeout period or (2) the remote unit 14B does not reply to the lead unit's command within a designated time interval.

If the lead unit 14A is unable to initially link with a remote unit 14B or a communications session is broken, it may repeat the command or link message. After a certain number of unsuccessful message retries, the lead unit 14A may send a message requesting that a repeater 24 assist in communications. Upon receipt of this "help request," the repeater 24 will begin to relay messages from the lead unit 14A to the remote unit 14B. The repeater 24 is considered an "intelligent" repeater in that it does not repeat all messages within its reception range, only those where assistance has been requested.

The distributed power system also includes a communications channel contention system for minimizing the probability of multiple units transmitting on the same communication channel at the same time and for insuring that the highest priority communications in each train 10 are transmitted first in time measured from the end of the latest transmission on the radio communications channel.

For example, a combination of fixed and randomized time intervals measured from the end of the latest transmission may be assigned for making the various types of communications in the system. The random time periods are generated in each unit's microprocessor by a random number generator. The count of the random number generator at the end of the latest transmission is used to calculate the transmission delay count based on the current status of the unit. The delay begins immediately when a transmission is required to be made. If the timer is still running, the transmission is delayed. If the timer has run out, the transmission proceeds. Each unit makes its transmission on a real time basis as soon as the condition warranting the transmission has occurred and the requisite time interval of radio channel silence has elapsed from the latest transmission on the channel. The primary principle of operation of the channel contention system is that the first unit to begin transmitting prevents the other units from transmitting as a consequence of the above described transmission time determining system in which the time interval of radio channel silence is begun again. However, even with this channel contention system, there are a limited number of channels and sessions available for use. When the number of trains 10 in a given area is high, as would occur in a rail yard or similar location, the possibility of channel saturation is present. The repeater 24 is programmed so as to operate using a process that minimizes any contribution of its own to radio traffic that could lead to saturation.

Figure 2:
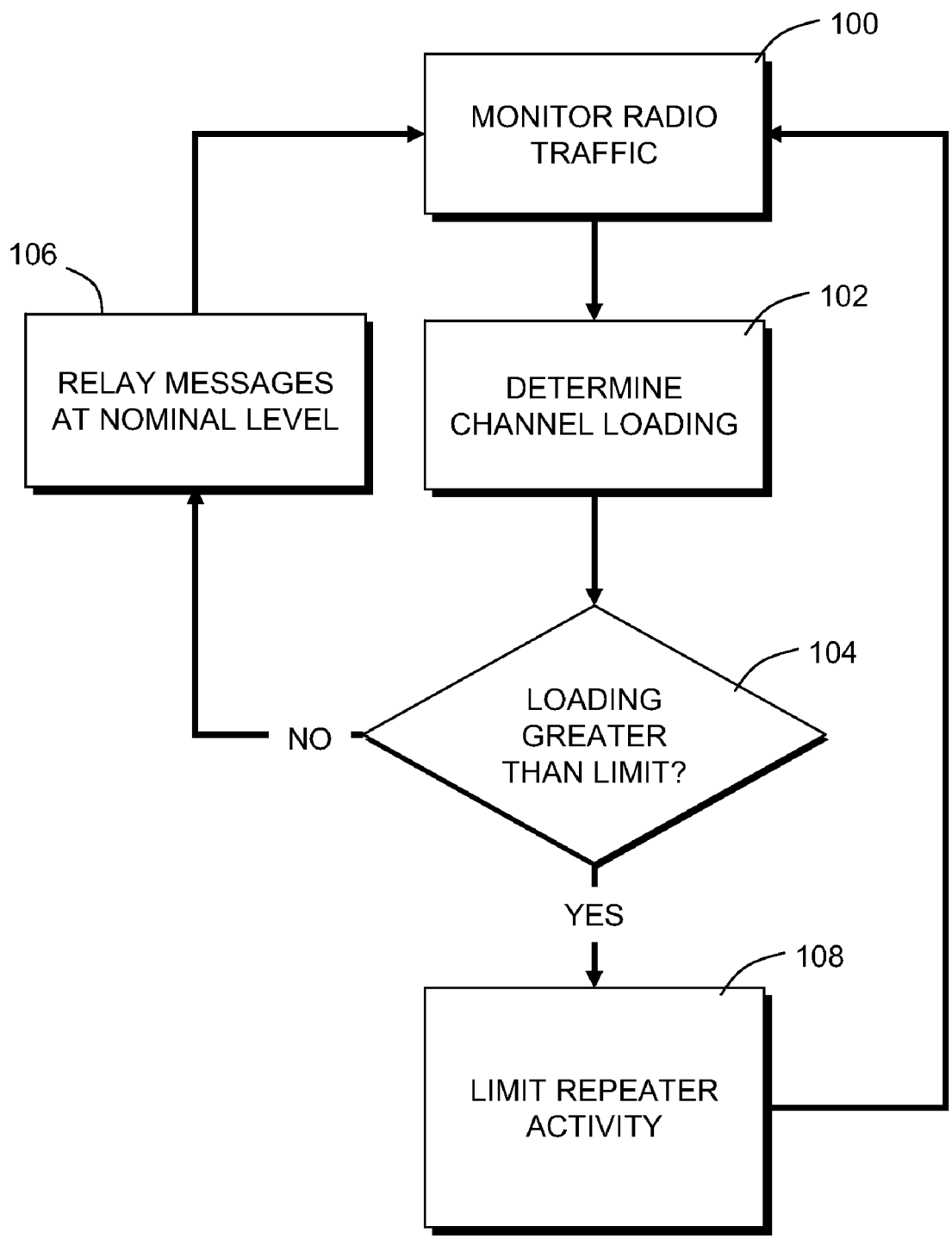
FIG. 2 is a block diagram illustrating the operation of a message repeater according to an aspect of the present invention.

FIG. 2 is a block diagram of the process. Beginning at block 100, the repeater 24 monitors all radio traffic within its reception area. The traffic may be logged or recorded, for example in a data file on a hard disk, magnetic tape, or other suitable memory medium. The repeater 24 monitors all traffic on all channels that it services, rather than just radio traffic from trains 10 requesting assistance, in order to have an accurate picture of the total channel loading.

The repeater 24 performs a running analysis on the monitored radio traffic (see block 102) to determine the level of loading of each channel. The processor 28 may incorporate an embedded radio traffic model for this purpose. The repeater examines information contained with the standard binary coded messages described above in order to determine how many trains that are linked, trying to link, and requesting assistance from the repeater. For example, a link message will contain a unique identifier and is therefore representative of a particular lead unit 14A that is trying to link. Also, a command message and its corresponding response will also contain unique identifiers of both the lead unit 14A and the remote unit 14B, and the pair of messages are therefore representative of a particular train 10 which is linked. The number of link attempts and/or linked trains 10 can be compared against a standard created from radio traffic models and/or empirical observations of communications channel capacity.

The repeater 24 may also be programmed to look for one or more discrete markers of excessive channel loading. For example, if the radio traffic contains multiple link messages or commands sent without corresponding replies, this indicates multiple retry attempts by lead units 14A. In an area such as a rail yard, there should not be a lot of retries in the absence of channel congestion. Accordingly, an excess of retry attempts may be flagged as a possible channel saturation. Another discrete marker is the presence of help requests. Help requests are similar to retry attempts in that they should be relatively limited in number in an area such as a rail yard, where lines of sight are generally good. The precise number of retry attempts or help requests which constitute a flag may be determined in a number of ways to suit a particular application, for example through empirical studies or through theoretical models of the radio traffic.

At block 104, the repeater 24 tests channel loading against a preset channel loading level. The preset limit may be a simple count of the number of retry requests or help requests occurring over a given time period. Alternatively, the limit may be based on a theoretical or empirical model of the radio traffic. For example, analysis may show that a channel can support a maximum number of linked trains and/or a maximum number of link requests in a given time period. In any case the purpose of the preset limit is to identify a level of radio traffic at which the addition of repeater activity will cause, or is likely to cause, channel saturation with attendant blocking and loss of messages.

If the radio traffic does not exceed the pre-set level, message relaying at a nominal activity level (e.g., on demand) is enabled (block 106) and the cycle repeats from block 100.

At block 108, if the channel loading exceeds the preset channel loading limit, the repeater 24 takes one or more actions to reduce the repeater activity level, so as to reduce the channel loading and/or prevent additional loading. For example, the repeater 24 may stop relaying messages that are identified as low-priority messages while continuing to relay other message traffic. One example of a low-priority message would be a link command. Dropping link messages preferentially helps ensure the highest quality communications to already-established communications sessions. Multiple levels of message priority may be defined, with each level having a corresponding category of response from the repeater 24. For example, another, more restrictive action would be to stop relaying all messages that are not of an urgent nature (e.g., penalty brake applications) or of emergency nature. In a worst-case situation the repeater 24 may be programmed to respond by stopping all message relay activity. Generally speaking, if the channel loading is less than the predetermined limit, the repeater relays messages over the wireless communications channel at a first activity level. If on the other hand the channel loading exceeds the predetermined limit, the repeater relays messages over the wireless communications channel at a second activity level less than the first level.

The response strategy may be implemented in various ways to suit a particular application. For example, the difference in the channel loading and the present limit may be quantified and used to trigger different responses. For example, if the channel loading were just beyond the preset limit, then a mild response would be used, but if the channel loading were substantially greater than the preset limit, a stronger response would be used.

Alternatively, the repeater responses may be staged. In other words, when the preset limit is first exceeded, the repeater 24 may default to using a mild response while continuing to monitor radio traffic. If the channel loading does not improve in subsequent monitoring cycles, then the repeater would proceed to a stronger response, ultimately ceasing all message relay activity if necessary.

In any case, the repeater 24 may be programmed to send a message over the communications channel or another wireless or wired communications route to a remote user at the control tower 30, a central office, or other location indicating that overloading has occurred, so that appropriate action can be taken. The monitoring and analysis cycle repeats from block 10.

Hysteresis or "deadband" may be incorporated in the channel loading testing at block 104 to prevent "hunting" or a rapid change in the repeater's responses. For example, the preset limit may be expressed as a "stop repeating" limit and a "continue repeating" limit, with the "stop repeating" limit set at a higher channel loading than the "continue repeating" limit. Furthermore, the "stop repeating" and "continue repeating" limits may be user configurable over a given range.

The end result of the process described above is to reduce the channel congestion on a particular communications channel due to multiple trains linking, arriving, and departing within radio line-of-sight of the rail yard. This permits the benefit of a repeater located in a rail yard or other congested location, while mitigating its possible drawbacks.

The foregoing has described a message repeater system and a method for its operation. While specific embodiments of the present invention have been described, it will be apparent to those skilled in the art that various modifications thereto can be made without departing from the spirit and scope of the invention. For example, while the message repeater has been described in the context of operating a train in a rail yard, the principles thereof are equally applicable to other types of vehicles and communication systems. Accordingly, the foregoing description of the preferred embodiment of the invention and the best mode for practicing the invention are provided for the purpose of illustration only and not for the purpose of limitation.

What is claimed is:

1. A method of operating a distributed power repeater for a train system, the method comprising:
   (a) using the repeater, monitoring all radio traffic within a reception range of the repeater on a plurality of wireless communications channels serviced by the repeater to relay messages comprising distributed power commands between a plurality of transmitters and receivers disposed on a plurality of trains for distributed power control of the trains;
   (b) using the repeater, determining a level of channel loading on each of the channels;
   (c) using the repeater, comparing the level of channel loading for each of the channels to a predetermined limit; and for each of the channels,
   (d) if the level of channel loading is less than the predetermined limit, using the repeater to relay messages over the channel at a first activity level;
   (e) if the level of channel loading exceeds the predetermined limit, using the repeater to relay messages over the channel at a second activity level less than the first activity level.

2. The method of claim 1 further comprising carrying out steps (a)-(e) in a repeating cycle.

3. The method of claim 1 further comprising quantifying a difference between an observed channel loading level and the predetermined limit.

4. The method of claim 3 further comprising determining a magnitude of the second activity level based on the difference between the observed channel loading level and the predetermined limit.

5. The method of claim 4 wherein the greater the degree to which the channel loading exceeds the predetermined limit, the lower the second activity level.

6. The method of claim 1 wherein the second activity level corresponds to complete cessation of relaying messages.

7. The method of claim 1 wherein: the predetermined limit comprises nonequal upper and lower limits, the comparison of step (d) is carried out using the lower limit, and the comparison of steps (e) is carried out using the upper limit.

8. The method of claim 1 further comprising transmitting a message to a remote user whenever the predetermined limit is exceeded.

9. The method of claim 1 further comprising:
(a) receiving at least one help request from the one or more transmitters, and
(b) determining the channel loading at least in part based on the number of help requests occurring in a selected time period.

10. The method of claim 1 further comprising:
(a) determining how often at least one of the transmitters retries to send messages; and
(b) determining the level of channel loading at least in part based on the number of retries occurring in a selected time period.

11. The method of claim 1 wherein each of the messages is uniquely identifiable, the method further comprising determining the level of channel loading at least in part by the number of messages being sent in a selected time period.

12. The method of claim 1 wherein groups of related messages constitute identifiable communication sessions, the method further comprising determining the level of channel loading at least in part by the number of simultaneous communications sessions present.

13. The method of claim 1 further comprising carrying out steps (a)-(e) in a repeating cycle, wherein if the level of channel loading continues to equal or exceed the predetermined limit over subsequent time cycles, despite operation at the second activity level, the repeater reduces the magnitude of the second activity level in subsequent cycles.

14. A distributed power repeater for a train system, the repeater programmed to:
(a) monitor all radio traffic on a plurality of wireless communications channels serviced by the repeater to relay messages comprising distributed power commands between a plurality of transmitters and receivers disposed on a plurality of trains for distributed power control of the trains;
(b) determine a level of channel loading on each of the channels;
(c) compare the channel loading of each of the channels to a predetermined limit; and
for each of the channels,
(d) if the level of channel loading is less than the predetermined limit, relay messages over the channel at a first activity level; and
(e) if the level of channel loading exceeds the predetermined limit, relay messages over the channel at a second activity level less than the first activity level.

15. The repeater of claim 14 wherein the repeater is further programmed to quantify a difference between an observed channel loading level and the predetermined limit.

16. The repeater of claim 15 wherein the repeater is programmed to determine the magnitude of the second activity level based on the difference between the observed channel loading level and the predetermined limit.

17. The repeater of claim 16 wherein greater a degree to which the level of channel loading exceeds the predetermined limit, the further the repeater is programmed to lower the second activity level.

18. The repeater of claim 14 wherein the second activity level corresponds to complete cessation of relaying messages.

19. The repeater of claim 14 wherein the predetermined limit comprises nonequal upper and lower limits, the comparison of step (d) is carried out using the lower limits; and the comparison of steps (e) is carried out using the upper limit.

20. The repeater of claim 14 wherein the repeater is programmed to transmit a message to a remote user whenever the predetermined limit is exceeded.

21. The repeater of claim 14 wherein the repeater is further programmed to:
(a) receive at least one help request from the one or more transmitters, and
(b) determine the level of channel loading at least in part based on the number of help requests occurring in a selected time period.

22. The repeater of claim 14 wherein the repeater is further programmed to:
(a) determine how often the one or more transmitters are retrying to send messages; and
(b) determine the level of channel loading at least in part based one the number of retries occurring in a selected time period.

23. The repeater of claim 14 wherein each of the messages is uniquely identifiable, the repeater being programmed to determine the level of channel loading at least in part by the number of messages being sent in a selected time period.

24. The repeater of claim 14 wherein groups of related messages constitute identifiable communication sessions, and wherein the repeater is programmed to determine the level of channel loading at least in part by the number of simultaneous communications sessions present.

25. The repeater of claim 14 which is programmed to carry out steps (a)-(d) in a repeating cycle, wherein if the level of channel loading continues to equal or exceed the predetermined limit over subsequent time cycles, despite operation at the second activity level, the repeater is programmed to reduce the magnitude of the second activity level in subsequent cycles.

* * * * *